United States Patent [19]

Miyata

[11] Patent Number: 4,983,407

[45] Date of Patent: Jan. 8, 1991

[54] PROCESS FOR PRODUCING MARMELO WINES

[75] Inventor: Takashi Miyata, Setagaya, Japan

[73] Assignee: Hakodate Winery Ltd., Hokkaido, Japan

[21] Appl. No.: 479,852

[22] Filed: Feb. 14, 1990

[51] Int. Cl.$^5$ ............................................. C12G 1/00
[52] U.S. Cl. ...................................... 426/15; 426/592; 426/62
[58] Field of Search ...................... 426/11, 15, 592, 62

[56] References Cited

U.S. PATENT DOCUMENTS 4,680,179  7/1987  Lidman ................................ 426/15

FOREIGN PATENT DOCUMENTS

| 2580665 | 10/1986 | France | 426/15 |
| 0009481 | 1/1985 | Japan | 426/15 |
| 1028715 | 7/1983 | U.S.S.R. | 426/15 |
| 1047953 | 10/1983 | U.S.S.R. | 426/15 |

OTHER PUBLICATIONS

The Great Dictionary of Botany, published by Shogakkan, 1989, pp. 513–514.
Random House Unabridged Dictionary, 1967, p. 1180.
Merck Index, Ninth Edition, 1976–p. 564 and pp. 1172–1173.
Dictionary of Fermentation, 1988–Published by Assakura Soten.

*Primary Examiner*—Marianne Cintins
*Attorney, Agent, or Firm*—Klauber & Jackson

[57] ABSTRACT

A process for producing marmelo wines is disclosed. The process comprises the steps of crushing marmelo fruits, thereafter pressing the fruits to remove marmelo juices, adding gelatin in an amount of 0.1 to 0.5 percent by volume to the marmelo juice to precipitate and remove a polyphenol compound contained in the marmelo juice, and adding wine yeast in an amount of 200 to 250 ppm by volume to the marmelo juice or material in which water is added to the juice for low temperature fermentation.

2 Claims, No Drawings

PROCESS FOR PRODUCING MARMELO WINES

BACKGROUND OF THE INVENTION

1. Field of the Invention

This invention relates to a process for producing marmelo wines.

2. Description of the Prior Art

It has been heretofore impossible to brew wines using marmelo while leaving a scent peculiar to marmelo in view of a problem of fermentation steps.

The present applicant has investigated the relation of cause and effect of the above to find that good fermentation could not be performed since wine yeast is rendered inactivate by a polyphenol compound (tannin) contained in marmelo, and as a result, a scent peculiar to marmelo has vanished after formation.

SUMMARY OF THE INVENTION

It is an object of the present invention to provide a process for producing marmelo wines leaving a scent peculiar to marmelo by rationally removing a polyphenol compound contained in marmelo to render wine yeast inactive to thereby effect good fermentation.

It is a further object of the present invention to provide a process for producing wines mixed with marmelo in which a marmelo juice is principally used and other juices are mixed therewith.

For achieving the aforesaid objects, a process for producing marmelo wines according to the present invention comprises the steps of crushing marmelo fruits and thereafter compressing the same to extract marmelo juices, adding gelatin in an amount of 0.1 to 0.5 per cent by volume to the marmelo juice to precipitate and remove a polyphenol compound contained in the marmelo juice, and adding wine yeast in an amount of 200 to 250 ppm per cent by volume to the marmelo juice or a material to which juice water is added to ferment the same at a low temperature.

Juices other than marmelo may be mixed with the marmelo juice or the material to which juice water is added with the polyphenol compound removed as described above, and wine yeast in an amount of 200 to 250 ppm per cent by volume may be mixed with the first mentioned mixed juice and subjected to low temperature fermentation.

According to the above-described means, when gelatin is added to the marmelo juice, the polyphenol compound contained in the marmelo juice is combined by the gelatin and then aggregated, precipitated and removed.

When the wine yeast is added to the marmelo juice with the polyphenol compound which impedes fermentation removed, which is then subjected to low temperature fermentation, the wine yeast is well fermented while decomposing sugar.

According to the low temperature fermentation, a component of scent mainly comprising alcohol is formed without being volatilized.

Furthermore, when water is added to the marmelo juice, a relatively high acidity of marmelo juice is suppressed to an acidity suitable for fermentation.

When other juices are added to the marmelo juice, the scents of the marmelo juice and other juices are mixed to produce a new scent, and the acidity of the marmelo juice is suitably diluted by the other juices similarly to the material in which water is added to the marmelo juice.

EXAMPLES

An example of the present invention will be described hereinafter.

Completely ripened marmelo fruits are used. The marmelo fruits are washed with water, after which they are crushed by a hammer mill while leaving a part of pulp. A pectin decomposed enzyme in an amount of 0.05 to 0.1% is added to the crushed fruits to prevent turbidity of the juice to be extracted.

The thus crushed fruits are put in the cloth made of synthetic resin fiber and stacked within a pressing vessel. The fruits are then pressed under pressure of 100 to 120 kg/cm$^2$ by a hydropress to remove marmelo juice. The juice pressing rate is 45 to 55%.

A large amount of polyphenol compound which impedes fermentation by wine yeast are contained in the marmelo juice.

Gelatin in an amount of 0.1 to 0.5 per cent by volume is added to the marmelo juice in order to remove the polyphenol compound.

Thereby, the polyphenol compound in the marmelo juice is embraced by the gelatin and then aggregated and precipitated. This is processed by a centrifugal separater to remove the aggregate and obtain the remaining juice.

Approximately 30% of water is added to the marmelo juice and sugar is added thereto to reach the sugar content of 17 degrees. Dry wine yeast in an amount of 200 to 250 ppm by volume is added thereto for fermentation.

The marmelo juice has a relatively high acidity. By adding water, the acidity is made close to pH 3.2 to 3.5 suitable for fermentation, whereby a good fermentation state is obtained.

Fermentation proceeds while the wine yeast decomposes the sugar within the marmelo juice. When the sugar degree is 10 degrees or less, the second addition of sugar by 8% is effected and when the alcohol degree assumes 10%, methapotassium sulfite is added or heating and sterization are effected to terminate main fermentation.

The fermentation step is done by the low temperature fermentation. The main fermentation is effected for one month to one and half months under the atmosphere at temperature of 13° to 18° C., and after 3 to 4 months, carbon dioxide gas is removed by fermentation to obtain a wine-like product up to 10.7% of alcohol content.

According to the low temperature fermentation which involves fermentation for a long period of time at a low temperature, volatilization of the scent component of the marmelo juice mainly comprising the alcohol content is suppressed, In addition, the polyphenol compound contained in the marmelo juice is removed as previously mentioned so that the fermentation can be effected in a good condition similar to the other juices, thus obtaining wines having an essence of approximately 5% having a scent peculiar to marmelo.

Furthermore, according to the present invention, it is also possible to brew marmelo mixed wines in which juices other than marmelo are mixed into the marmero juice.

In the manner similar to that as mentioned above, the gelatin is added to the marmelo juice extracted from the fruits to remove the polyphenol compound contained in the juice, and 45% of juices of grapes, apples, oranges, strawberries, etc. are mixed into the marmelo juice or 55% of material in which water is added to the marmelo juice.

Then, the wine yeast is added to the thus mixed juice. Thereafter, the low temperature fermentation is effected in a manner similar to that as described above. A marmelo mixed wine having a new scent in which the marmelo and other juices are mixed is obtained.

Particularly, since apples are free from one-sided scent, new wine making the best use of the scent of the marmelo can be produced.

As described above, other juices having a low acidity is added to the marmelo juice having a relatively high acidity whereby the acidity of the mixed juice can be brought close to the acidity suitable for fermentation so that fermentation can be carried out in the good condition, similarly to the case where water is added to the marmelo juice.

It is to be noted that since the addition of the gelatin is to aggregate, precipitate and remove the phenol compound contained in the juice, such addition may be made after the marmelo juice and other juices have been mixed.

The present invention has the following effects.

By the embracing action of the gelatin, the polyphenol compound which impedes the fermentation action of the wine yeast can be effectively aggregated and removed from the marmelo juice. Therefore, it is possible to ferment the marmelo juice in a satisfactory manner similar to the other juices. Moreover, the marmelo juice to which is added the wine yeast is fermented by the low temperature fermentation by which the scent component is less volatized to thereby enable brewing wines which are rich in scent peculiar to marmelo.

By adding water to the marmelo juice, it is possible to suppress the relatively high acidity of marmelo juice to a degree suitable for fermentation, whereby fermentation can be carried out in a satisfactory manner to further increase the scent of marmelo.

Furthermore, by mixing the juices other than marmelo into the marmelo juice, wines having a new scent in which marmelo and other juices are mixed can be brewed. Moreover, the marmelo juice is diluted by the other juices whereby the relatively high acidity of marmelo juice can be suppressed to a degree suitable for fermentation. Thereby, fermentation can be carried out in a satisfactory manner to further increase the scent of juice.

What is claimed is:

1. A process for producing marmelo wines, the process comprising crushing marmelo fruits, pressing said fruits to remove marmelo juice, adding gelatin in an amount of 0.1 to 0.5 per cent by volume to said marmelo juice to precipitate and remove a polyphenol compound contained in said marmelo juice, and adding wine yeast in an amount of 200 to 250 ppm by volume to said marmelo juice for low temperature fermentation.

2. A process for producing marmelo wines, the process comprising crushing marmelo fruits, pressing said fruits to recover a quantity of marmelo juice, adding gelatin in an amount of 0.1 to 0.5 per cent by volume to said marmelo juice to precipitate and remove a polyphenol compound contained in said marmelo juice, mixing said marmelo juice with other fruit juices and adding wine yeast in an amount of 200 to 250 ppm by volume to the mixture of said marmelo juice and said other fruit juices, for low temperature fermentation.

* * * * *